Figure 1:
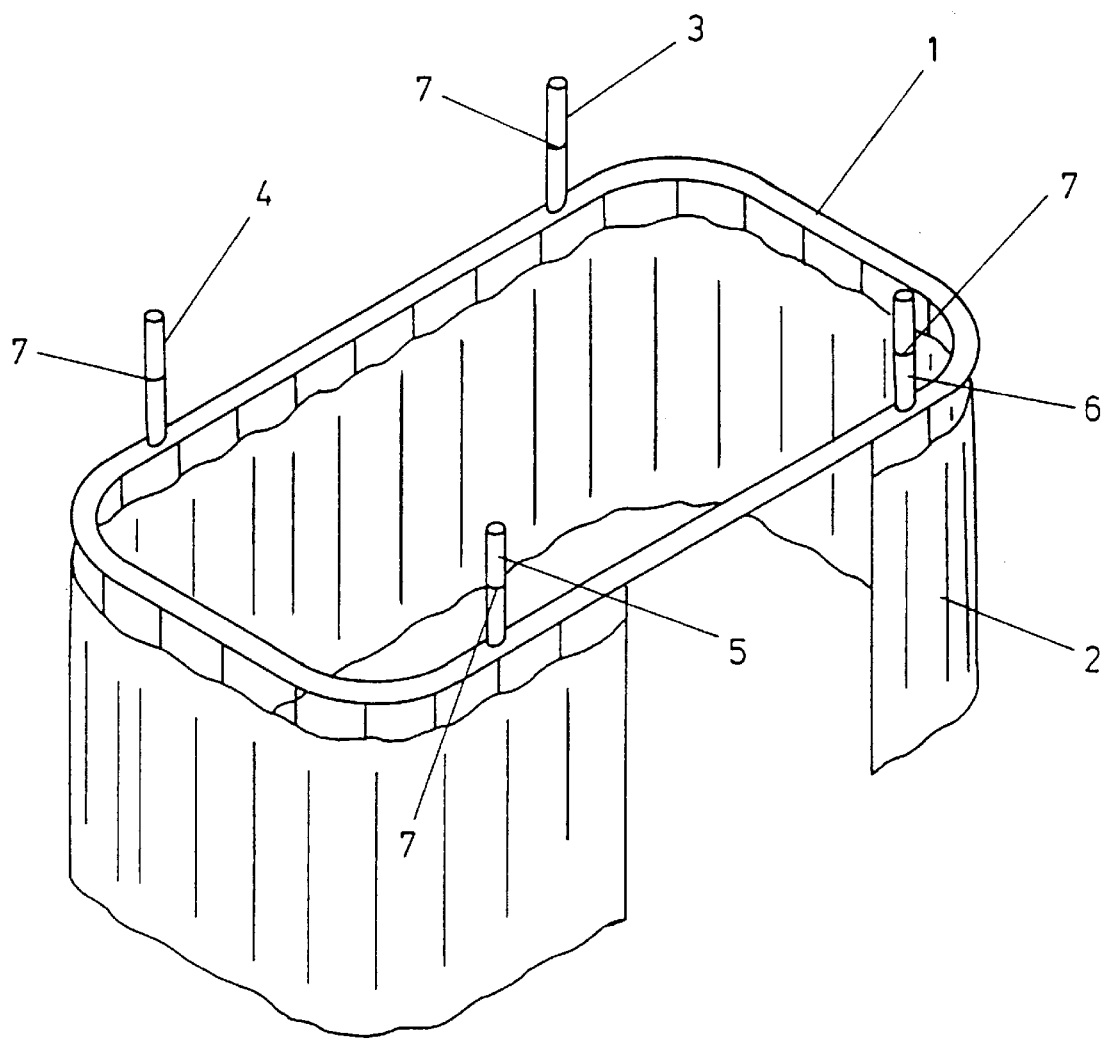

015957612A

United States Patent [19]
Bradley

[11] Patent Number: 5,957,612
[45] Date of Patent: Sep. 28, 1999

[54] RE-USABLE BREAKAWAY SAFETY JOINT

[76] Inventor: James Hayden Bradley, 54 St Philip's Drive, Hasland, Chesterfield, United Kingdom, S41 ORG

[21] Appl. No.: 08/809,524
[22] PCT Filed: Sep. 14, 1995
[86] PCT No.: PCT/GB95/02164
    § 371 Date: Mar. 26, 1997
    § 102(e) Date: Mar. 26, 1997
[87] PCT Pub. No.: WO96/10132
    PCT Pub. Date: Apr. 4, 1996

[30] Foreign Application Priority Data

Sep. 26, 1994 [GB] United Kingdom ................... 9419370

[51] Int. Cl.⁶ ..................................................... F16B 27/00
[52] U.S. Cl. ................................................ 403/2; 135/114
[58] Field of Search ................................. 403/2, 41, 326, 403/327, 328; 248/320, 900; 135/114, 16, 909

[56] References Cited

U.S. PATENT DOCUMENTS

| 2,847,238 | 8/1958 | Bolling, Jr. .............................. 287/110 |
| 2,916,787 | 12/1959 | Samiran ..................................... 24/215 |
| 4,136,982 | 1/1979 | Sagady ..................................... 403/108 |
| 5,080,521 | 1/1992 | Quaile ..................................... 403/326 |
| 5,518,335 | 5/1996 | Dobbins ................................... 403/328 |

FOREIGN PATENT DOCUMENTS

| 686115 | 1/1940 | Germany . |
| 2016252 | 10/1971 | Germany . |
| 2088148 | 6/1982 | United Kingdom . |

Primary Examiner—Anthony Knight
Assistant Examiner—David Bochna
Attorney, Agent, or Firm—Berstein & Associates, PC

[57] ABSTRACT

A safety curtain rail comprises a curtain rail suspended by connectable and disconnectable joints, each comprising a plug and socket. Each joint comprises a plug (40), a socket (10), the plug being provided with an engagement portion (43) and the socket comprising a tubular bore (20), the engagement portion fitting into the tubular bore. Between the engagement portion and the bore is provided a resilient ring (51). The relative dimensions of the engagement portion, socket and resilient ring and the flexibility of the ring are selected such that the plug can disconnect from the socket under a predetermined force in a direction pulling the plug apart from the socket.

20 Claims, 5 Drawing Sheets

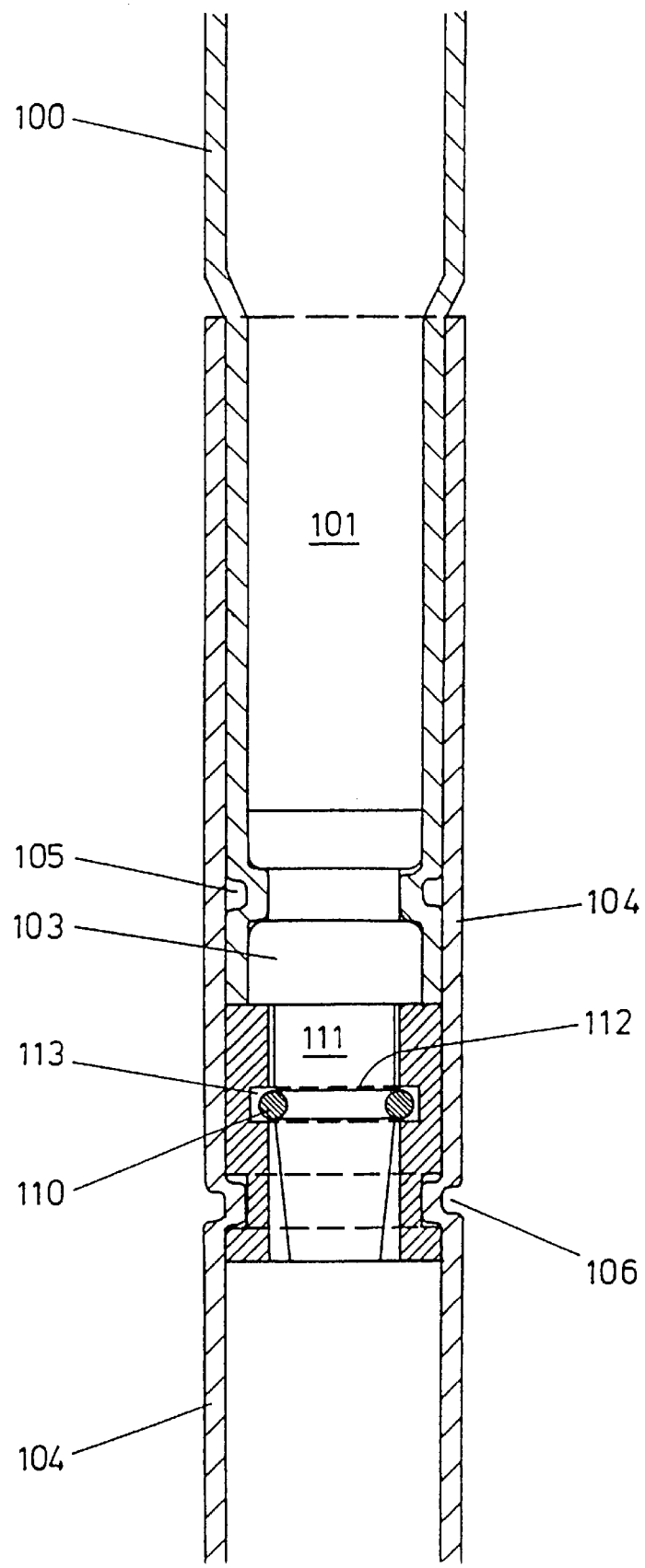

RE-USABLE BREAKAWAY SAFETY JOINT

FIELD OF INVENTION

The present invention relates to a safety joint, and particularly although not exclusively, a safety joint for suspension of an overhead rail.

BACKGROUND ART

It is an increasing problem in public institutions, such as hospitals, that patients attempt suicide by hanging themselves by the neck.

There have been several instances in which patients have been found hanged by the neck from an overhead curtain rail around a hospital bed.

U.S. Pat. No. 2,847,238 describes a pin retainer for use in pipe tongs and the like and has application in machine parts where there is only a radial thrust and no or substantially little end thrust. U.S. Pat. No. 2,916,787 describes a fastener for fastening aircraft fuel cells to the aircraft frame and comprises a split snap ring received in an annular space of a stud or socket member. U.S. Pat. No. 4,136,982 describes a fastener assembly having a snap ring centered by a metallic spring construction.

DISCLOSURE OF THE INVENTION

The invention provides a safety curtain rail comprising a suspended rail, wherein the said rail is suspended by a plug and socket connector joint, said plug and socket connector joint comprising a retaining means which acts to retain the plug in the socket under load conditions below a predetermined load and to release the plug from the socket under load conditions equal to or exceeding the said predetermined load.

The rail may be suspended by a plurality of said plug and socket connector joints.

The rail may further comprise a bracket adapted for mounting to a wall or a ceiling, wherein said plug and socket connector joint is suspended from said bracket, such that a main weight component of the rail acts in a direction to urge the plug and socket of at least one plug and socket connector joint apart.

The rail may further comprise a plurality of brackets adapted for mounting to a wall or a ceiling, wherein each said plug and socket connector joint is suspended from a respective one of said plurality of brackets, such that a main weight component of the rail acts in a direction to urge the plug and socket of said plug and socket connector joint apart.

Advantageously, the retaining means comprises a resilient member and at least one of the plug and socket comprises a groove, the curvature of the retaining means and the curvature of the groove being substantially the same such that the retaining means is adapted to be received as a close fit in the groove and such that, in use, the retaining means retains the plug to the socket under load condition below the said predetermined load within a specified tolerance and deforms to release the plug from the socket under load conditions which equal or exceed the predetermined load, said load conditions comprising a load applied in a direction axially of a main length of the plug.

Preferably, the relative dimensions of the plug, socket, and resilient member are pre-selected, to produce release of the plug from the socket under a particular predetermined load.

Suitably, the rail further comprises an engagement portion on said plug, for engaging said socket. Advantageously, when a force in excess of a predetermined force is applied in a direction lengthwise along a main length axis of the joint, the engagement portion of the plug is caused to withdraw from the socket. The rail may further comprise a receiving portion on the socket, for receiving the engagement portion of the plug. The receiving portion of the socket may comprise an internal bore. Advantageously, a gap is defined between a surface of the bore of the socket, and an outer surface of the engagement portion said gap having a width of about 0.04 mm. The engagement portion of the plug may closely fit the bore of the socket.

Preferably said retaining means comprises a resilient member located, in use, between the engagement portion of the plug, and a body of the socket. Preferably the engagement portion of the plug closely fits the bore of the socket. The engagement portion is preferably provided with a peripheral groove extending in a direction transverse to a main axial length of the engagement portion, for locating the retaining means.

The retaining means may comprise a ring member. The ring member may have a substantially circular cross section. The ring may be toroidal, where the engagement portion of the plug is substantially circular. A head of the engagement portion is preferably tapered, and may be frusto-conically shaped, to facilitate passage of the upper end of the engagement portion through the retaining ring.

Preferably, the retaining ring is located in a recess in an internal bore of the socket. The recess may be defined between an upper bore portion having a first width, and a lower bore portion having a second, greater width, the retaining ring being located in the recess by a sleeve portion which fits into a lower end of the socket.

Suitably, when a force is applied in a direction lengthwise along a main length axis of the joint, the engagement portion of the plug is caused to withdraw from the socket. Preferably the retaining means deforms to an extent which allows the retaining means to slide out of said groove on the engagement portion and to allow the head of the engagement portion to pass through the retaining ring.

The relative dimensions of the head, groove, upper and lower bores of the socket, and recess of the socket are pre-selected, to produce release of the plug from the socket under a particular predetermined load.

Suitably, the retaining ring has a cross sectional circular diameter of the order of 3.0 mm. Preferably, a gap between a surface of the bore of the socket, and an outer surface of the engagement portion is of the order of 0.04 mm. A depth of the recess may be of the order of 3.6 to 3.8 mm, where the retaining ring has a cross sectional diameter of around 3 mm, there being a gap of around 0.6–0.8 mm between the retaining ring and the recess.

The retaining means may comprise a plurality of ball bearings.

A vent passage may be provided in the plug, passing through the engagement portion, for allowing release of pressure due to trapped air between the plug and socket. The vent passage may be of assistance in injection moulding of the plug where the plug is of a plastics material.

The invention includes a joint in which the retaining means comprises an engagement portion of the plug itself and a bore of the socket, the relative dimensions and resilience of the engagement portion and bore being such as to keep the plug and socket connected under normal loads in a direction such as to urge the plug and socket, apart, and to cause release of the engagement portion and bore when a predetermined load is experienced, in a direction so as to urge the plug and socket apart from one another.

BEST MODES FOR CARRYING OUT THE INVENTION

Referring to FIG. 1 of the accompanying drawings, there is shown schematically an overhead safety curtain rail 1 for suspending a curtain 2 around a hospital bed, the curtain rail 1 comprising a ring rail suspended at a plurality of suspension points 3–6 to a ceiling or wall (ceiling and wall not shown) by a plurality of joints 7.

The joints each comprise a plug and a socket, the plug and socket being arranged to release from each other once predetermined load is exceeded in a direction urging the plug and socket apart, and thereby to release the curtain rail from the ceiling.

For each joint, one of the plug or socket is adapted for connection to the curtain rail and the other of the plug or socket is arranged for connection to the suspension point. The suspension point may comprise a bracket attachable to the ceiling. In other cases, the suspension point may comprise a wall bracket, such that the rail is suspended from one or a plurality of said wall brackets.

Figure 2:
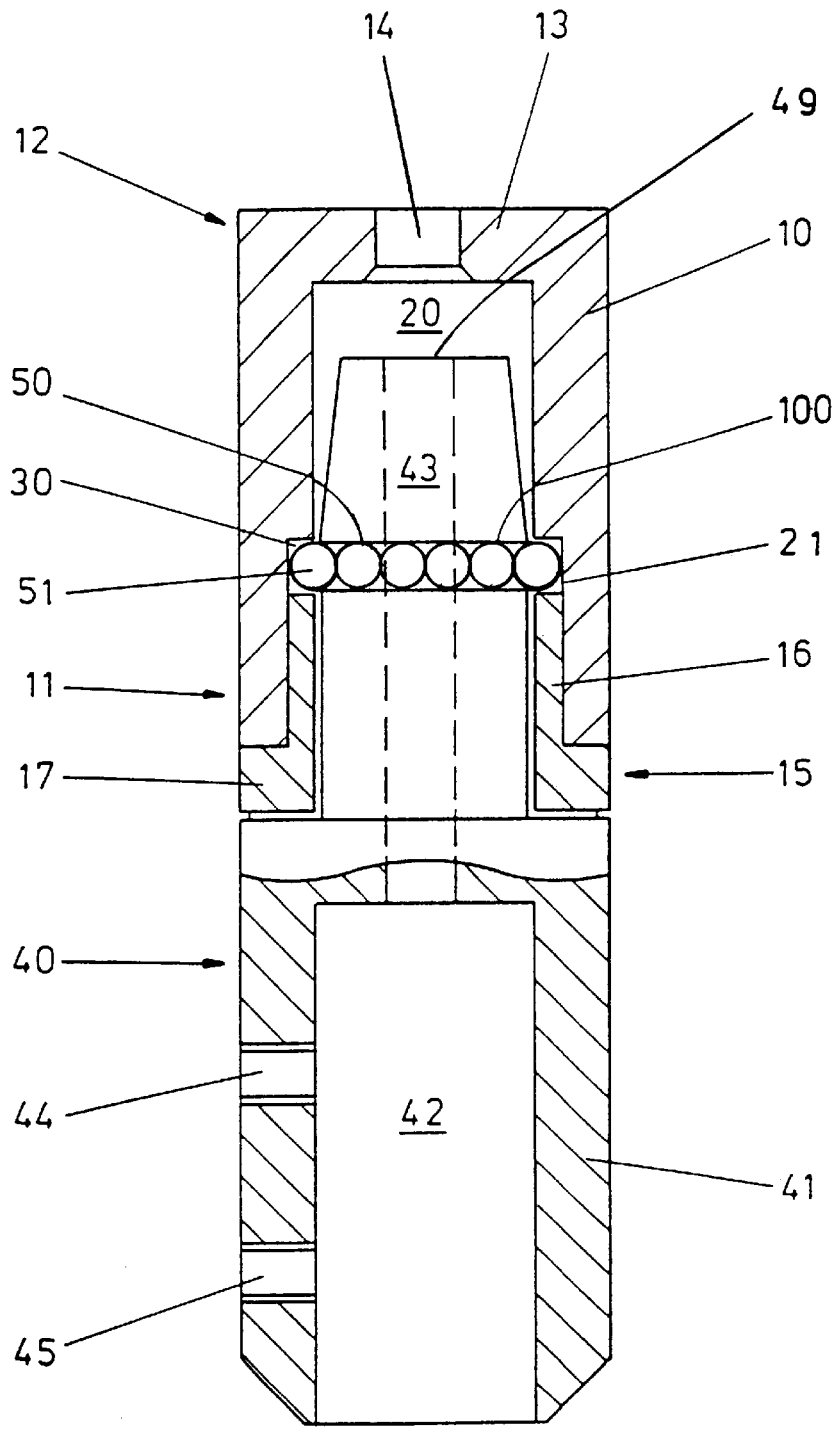
Figure 3:
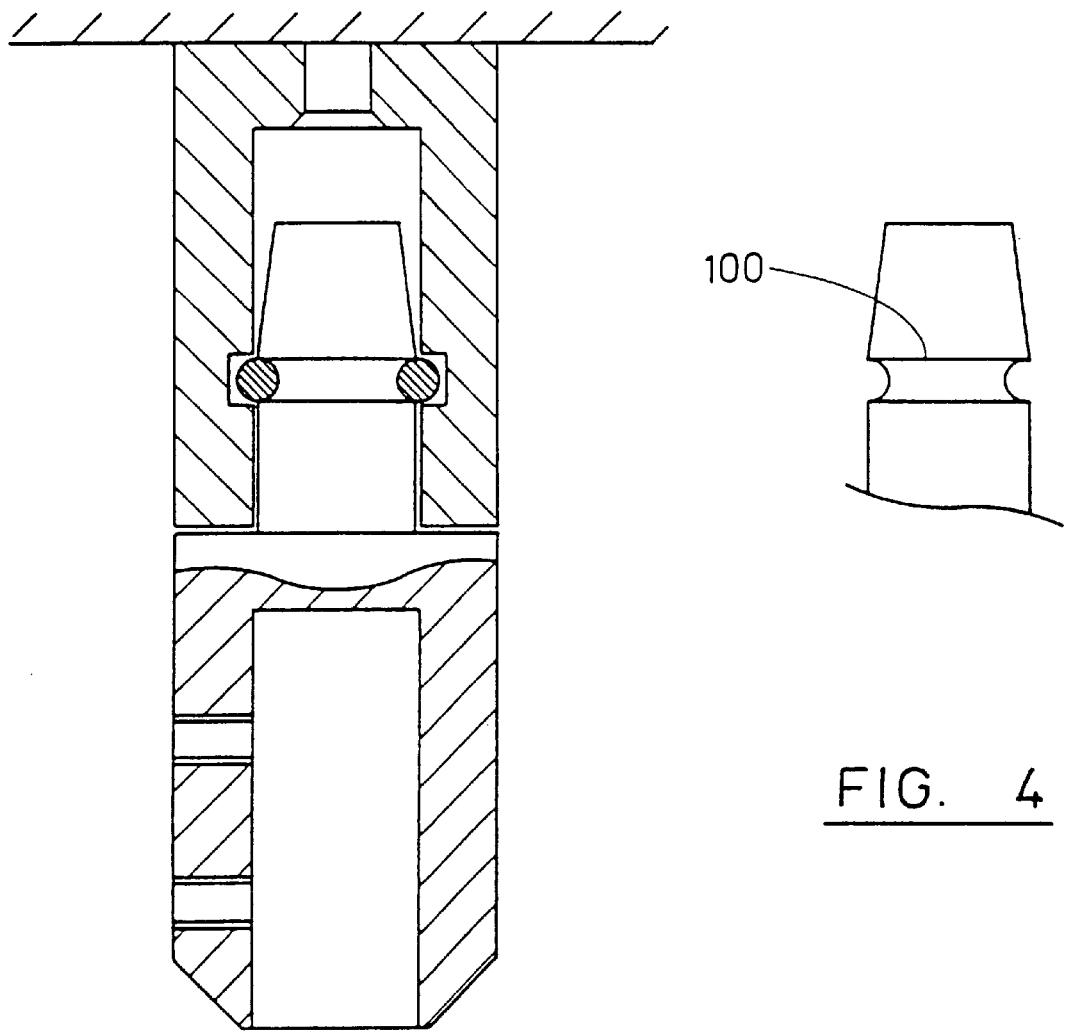

Referring to FIGS. 2 and 3 of the accompanying drawings, there are shown views of a first type of joint. The first type of joint comprises a tubular female socket 12, and a male plug 40. The first safety joint comrpises a tubular female socket 12, and a male plug 40. The socket 12 comprises an inner sleeve portion 15, and a tubular socket onto body 10, an open lower end 11, and an upper end 12, closed off by an end wall 13 which extends across the tubular socket outer body, the end wall 13 being provided with a clearance hole 14 through which a screw, bolt or other similar fixing means may be passed for attaching the socket to an overhead beam or ceiling such that the end wall 13 abuts the beam or ceiling being attached thereto by the screw, rivet or the like, and the lower open end 11 of the socket depends downwardly from the beam or ceiling, the socket outer body 10 having a tubular bore 20 separated into an upper bore portion at an upper end of the socket, nearest the end wall 13, and a lower bore portion 21 (shown filled in by the sleeve 15 in FIG. 2) having a second, larger width.

The tubular sleeve portion 15 is inserted into the lower end 11 of the outer tube 10, and a peripheral flange 17 at the lower end of the side wall 16 of the inner sleeve 15 and extending outwardly therefrom. The sleeve 15 is inserted into the lower end of the tubular socket body 10, such that an inner surface of the sleeve 15 and the upper tubular bore portion 20 of the socket 10 form a substantially continuous bore, with a recess 30 being formed between the lower sleeve and the upper bore 20. The recess 30 provided between the tubular socket body 10 and the sleeve 15 extends circumferentially around the bore of the socket.

The plug 40 comprises a tubular lower section 41 having an internal bore 42, which may be threaded for receiving a bolt or the like, or which may be smooth, and a protruding plug portion 43 extending coaxially of the lower tubular portion 40. The tubular portion 40 may be provided with threaded apertures 44, 45 drilled transversely to a main axis of the central bore 42, for retaining a tubular insert (not shown) connected to an overhead rail or the like and by which the overhead rail is suspended. The plug portion 43 is provided with a peripheral groove 50 extending circumferentially around the plug in a direction transverse to a main lengthwise axis of the plug, the groove being of substantially semi circular cross section, and adapted for receiving a rubber or plastics ring 51, which fits into the grooves and the recess 30.

Preferably, an outer portion of the protruding plug portion 43 above the groove 50 as seen in FIGS. 2 and 3, is tapered, or being shaped frusto-conically, to allow easy insertion of the plug into the socket. There may be provided a vent passage 49 in the engagement portion of the plug, for allowing air trapped between the plug and socket to escape, and facilitate easy connection of the plug and socket. The engagement portion may also be of assistance in injection moulding of the plug, where the plug is of a plastics material.

During manufacture, the ring 51 is inserted into the bore of the socket, before fitment of the sleeve, being located in abutment to a step between the upper and lower bores of the socket. The sleeve is then fitted into the lower end of the socket to locate the ring in the socket.

In use, the socket 10 is screwed to a beam or ceiling as described above, and the lower tubular portion 40 of the plug is attached rigidly to the suspended curtain rail or the like. The curtain rail may be attached by a plurality of such safety joints by inserting the respective plugs 43 of the plurality of such safety joints into the respective corresponding sockets 10 of the plurality of safety joints.

When the plug is inserted into the socket, the tapered upper end of the plug slides easily through the ring 51, and then snaps into place. The plug is retained in the socket by the ring member 51, which is trapped between the groove 50 on the plug and the recess 30 in the socket. The dimension and material of the ring 51 and the relative dimensions of the recess 30 and the groove 50 are selected such that the ring 51 will keep the plug in the socket provided a predetermined force drawing the plug and socket apart in a direction axially of a main length of the joint, and transverse to a main plane of the ring is not exceeded. Upon exceeding the predetermined force, the ring 51 deforms enough such that the ring slips out of the recess 30 or out of the groove 50, allowing the plug to withdraw from the socket.

In the first specific embodiment preferably, the tubular socket has an outside diameter of 25 mm, the lower bore has an internal diameter of between 18.7 and 18.8 mm, and the upper bore has an internal diameter of 15 mm. The clearance hole may be of diameter 5 mm. The sleeve may have an outer diameter which is an interference fit with the lower bore, or may be threaded so as to screw into a corresponding thread on the lower bore of the socket.

The plug may comprise a lower tubular portion of outside diameter of 25 mm to match the outside diameter of the socket, the outside diameter of the upstanding male portion 43 being of the order of 14.93 mm, and there being arranged to be a 0.04 mm gap or thereabouts, between the outer surface of the male portion of the plug and the inner surface of the socket, when the plug is engaged in the socket. The plastics or rubber ring 51 is preferably of toroidal shape eg. an "O" ring, having a cross sectional radius of 1.5 mm. The recess 30 defined by the socket and sleeve may be of substantially cylindrical cross section, having a depth 3.6 to 3.8 mm and a width of 1.8 to 1.9 mm. There may be a nominal clearance of around 0.5 to 1 mm between the lower surface of the flange of the sleeve and an upper shoulder portion on of the tubular body of the plug, when the plug is inserted into the socket, to allow for movement of the plug relative to the socket when the ring 51 is engaging in the recess 30.

The dimensions of the plug, socket and in particular the recess 30 and groove 50 are critical in determining the breaking force at which the plug is removable from the socket. For exa mple with the above dimensions of the recess 30, ring 51 and, a ten pound weight force will pull the plug out of the socket, where a nitrile ring 51 is provided. If any lubrication is added to the ring 51, then the breaking force may be reduced. The dimensions of the ring 51, groove 50 and recess 30 may be adjusted by trial and error, to achieve any desired breaking force. Such variations of the dimensions of the plug and socket may be made by trial and error.

Figure 4:
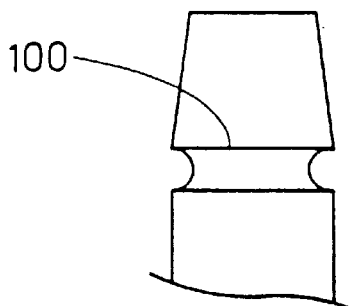

Further, the breaking force and ease of insertion of the plug into the socket may be varied by adjustment of the radius of an upper lip of the groove 50 over which the ring 51 slides to lock the plug into in the socket, the upper lip being shown at 100 in FIG. 4. When the plug is forcibly withdrawn from the socket, the ring 51 must deform in order for the plug to slip out of the socket. By varying the profile and radius of curvature of the upper lip of the groove 50, the breaking force between the plug and socket may be altered.

It will be appreciated by a person skilled in the art that a number of geometrical features including the groove on the male plug portion and the recess in the bore of the socket may be designed in order to achieve the desired effect. In particular, the profile and curvature of the upper lip of the groove 50 is critical in varying the breaking force of the joint for a given plug male portion outside diameter and socket internal bore diameter, as shown in FIGS. 2–4.

Figures 5, 6:
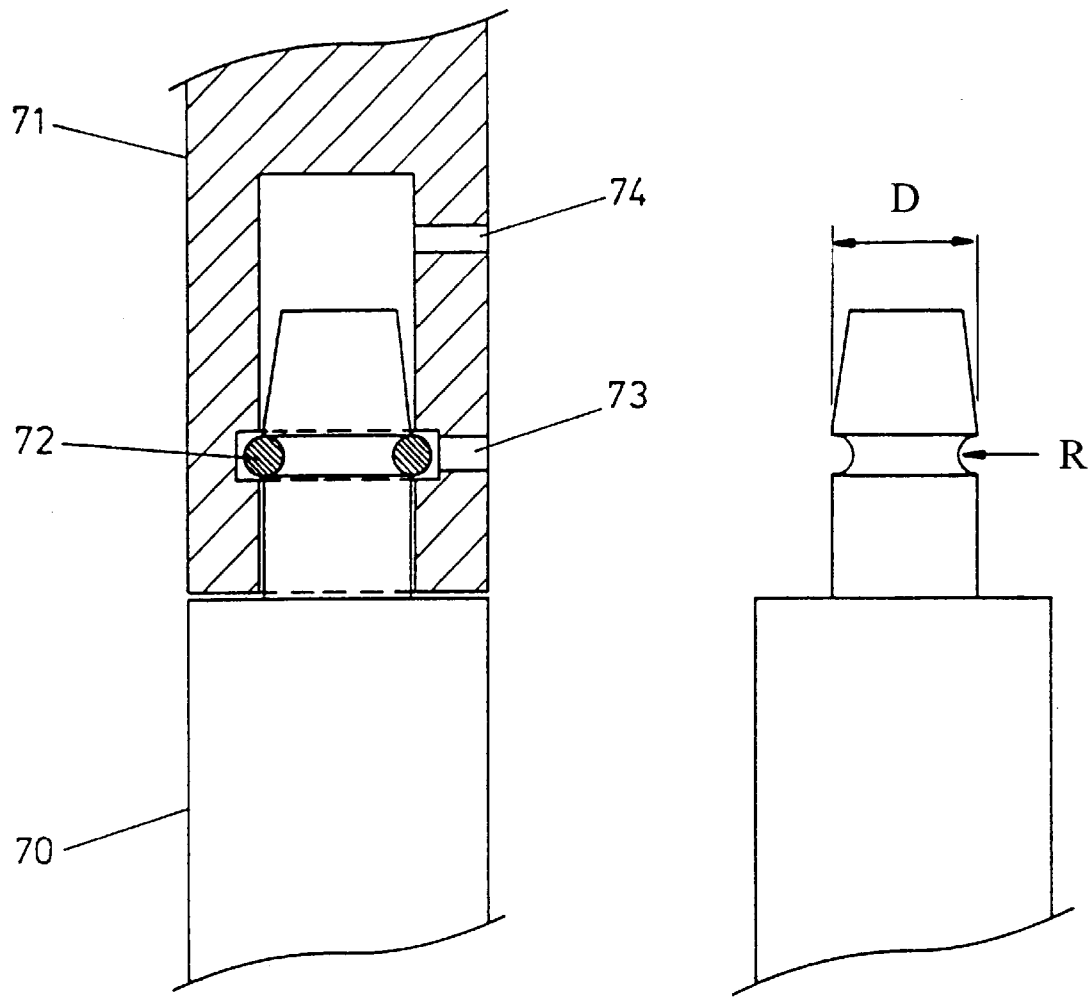

Referring to FIGS. 5 and 6 of the accompanying drawings, there is shown a second type of joint according to a second embodiment of the present invention. The second type of joint comprises a device which automatically releases two or more members e.g. a male and a female member, when subjected to an axial load greater than a desired load. The breakaway load is pre calculated by the design of dimensions of the device. After fulfilling its function the joint can be reset by pushing the male and female components together as shown in FIGS. 5 and 6.

The second type of joint does not rely on a fracture sheer of any given material to break the connection between the male and female components.

FIG. 5 shows a section general arrangement of the second embodiment. The second safety joint comprises a male spigot 70 manufactured from any suitable material, a female receiver 71 made from suitable material to complement the material of the male spigot 70; an energising ring, for convenience of description referred to here as an "O ring" 72; an aperture or hole 73 to facilitate easy removal of the "O" ring 72 a vent hole 74 to allow air to escape from a chamber in the female receiver and prevent air lock from affecting performance of the components. The "O" ring may be made from any suitable elastomer, plastics or metal material, material selection being made in accordance with the required breaking force for pulling apart the female receiver and the male spigot.

Referring to FIG. 6 of the accompanying drawings, there is shown in more detail the male spigot 70. A radius R and diameter D of the male spigot as shown in FIG. 6 may be varied individually or together as required, in addition to the dimensions of the "O" ring, to predetermine a required breaking force. The male spigot is tapered on a leading end to facilitate ease of engagement and freedom of release from the female receiver.

By providing for safe release of two joined components at a predetermined breaking force, the safety curtain rail of the invention prevents patients attempting suicide by hanging themselves by the neck from curtain rails from being successful.

Further, the invention allows, through trial and error, for the provision of a wide variety of breaking forces of a safety joint where the force is applied in a direction along a main length of the safety joint, to allow breaking of a safety joint at a predetermined and pre-calculable force.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A safety curtain rail comprising a suspended rail, wherein the said rail is suspended by a plurality of plug and socket connector joints, said plug and socket connector joints each comprising a resilient member capable of retaining said plug in said socket under load conditions below a predetermined load and to release said plug from said socket under load conditions equal to or exceeding said predetermined load.

2. A rail according to claim 1, further comprising an engagement portion (43) on said plug, for engaging said socket.

3. A rail according to claim 2, wherein the engagement portion (43) is provided with a peripheral groove (50) extending in a direction transverse to a main axial length of the engagement portion, for locating the resilient member.

4. A rail according to claim 3, wherein the ring (51) is capable of deforming to an extent which allows the ring to slide out of said groove (50) on to engagement portion and to allow the head of the engagement portion to pass through the ring.

5. The rail of claim 2, wherein when a force in excess of a predetermined force is applied in a direction lengthwise along a main length axis of the joint, the engagement portion (43) of the plug (40) is caused to withdraw from the socket (12).

6. A rail according to claim 2, further comprising a receiving portion (20) on the socket, for receiving the engagement portion of the plug.

7. A rail according to claim 6 wherein the receiving portion of the socket comprises an internal bore (20).

8. A rail according to claim 7, wherein a gap is defined between a surface of the bore (20) of the socket, and an outer surface of the engagement portion (43) said gap having a width of about 0.04 mm.

9. A rail according to claim 7, wherein the engagement portion (43) of the plug closely fits the bore (20) of the socket.

10. A rail according to claim 2, wherein the retaining means comprises a ring member.

11. A rail according to claim 10, wherein the ring member (51) has a substantially circular cross section.

12. A rail according to claim 11, wherein a head of the engagement portion (43) is tapered to facilitate passage of the engagement portion through the ring (51).

13. A rail according to claim 11, wherein the ring (51) is capable of being located in a recess (30) in an internal bore (20) of the socket.

14. A rail according to claim 1, wherein the relative dimensions of the plug (40), socket (12), and resilient member are pre-selected, to produce release of the plug from the socket under a particular predetermined load.

15. The rail according to claim 1, further comprising a plurality of brackets adapted for mounting to a wall or a ceiling, wherein each said plug and socket connector joint is suspended form a respective one of said plurality of brackets, such that a main weight component of the rail acts in a direction to urge said plug and socket of said plug and socket connector joint apart.

16. The rail according to claim 1, wherein at least one of said plug and socket comprises a groove, the curvature of said resilient member and the curvature of said groove being substantially the same such that said resilient member is adapted to be received as a close fit in said groove and such that, in use, said resilient member retains said plug to said socket under load condition below a predetermined and repeatable load within a specified tolerance and deforms to release said plug from said socket under load conditions which equal or exceed the predetermined and repeatable load, said load conditions comprising a load applied in a direction axially of a main length of said plug.

17. A rail according to claim 1, wherein the socket and/or plug are manufactured from a plastics material.

18. A rail according to claim 1, wherein the retaining means comprises a plurality of ball bearings.

19. A rail according to claim 1, wherein the said retaining means comprises a resilient member.

20. A rail according to claim 1, further comprising an aperture defined in said socket.

* * * * *